(12) United States Patent
Huang et al.

(10) Patent No.: US 8,452,829 B2
(45) Date of Patent: May 28, 2013

(54) REAL-TIME OPTIMIZATION OF TX FIR FILTER FOR HIGH-SPEED DATA COMMUNICATION

(75) Inventors: Dawei Huang, San Diego, CA (US);
Dong J. Yoon, Santa Clara, CA (US);
Osman Javed, Pleasanton, CA (US);
Zuxu Qin, Sunnyvale, CA (US);
Deqiang Song, San Diego, CA (US);
Daniel J. Beckman, Chula Vista, CA (US); Drew G. Doblar, San Jose, CA (US); Waseem Ahmad, Union City, CA (US); Andrew Keith Joy, Great Houghton (GB); Simon Dennis Forey, Earls Barton (GB); William Franklin Leven, Dallas, TX (US); Nirmal C. Warke, Irving, TX (US)

(73) Assignee: Oracle America, Inc., Redwood City, CA (US)

( * ) Notice: Subject to any disclaimer, the term of this patent is extended or adjusted under 35 U.S.C. 154(b) by 1372 days.

(21) Appl. No.: 12/144,610

(22) Filed: Jun. 23, 2008

(65) Prior Publication Data
US 2009/0316727 A1    Dec. 24, 2009

(51) Int. Cl.
*G06F 17/10* (2006.01)
(52) U.S. Cl.
USPC .......................................... 708/322; 375/232
(58) Field of Classification Search
USPC ............................. 708/322–323; 375/229–236
See application file for complete search history.

(56) References Cited

U.S. PATENT DOCUMENTS

| | | | | |
|---|---|---|---|---|
| 3,633,108 A * | 1/1972 | Kneuer | ......................... | 375/254 |
| 3,969,674 A * | 7/1976 | Tracey | ......................... | 375/235 |
| 4,928,287 A * | 5/1990 | Tanaka | ......................... | 375/231 |
| 5,490,169 A * | 2/1996 | Blackwell et al. | ............. | 375/232 |
| 5,869,072 A * | 2/1999 | Berry | ............................. | 424/402 |
| 6,167,082 A * | 12/2000 | Ling et al. | ...................... | 375/233 |
| 6,188,721 B1 * | 2/2001 | Shirani et al. | .................. | 375/232 |
| 6,192,071 B1 * | 2/2001 | Hirth et al. | ..................... | 375/232 |
| 6,556,637 B1 * | 4/2003 | Moriuchi | ........................ | 375/350 |
| 6,760,656 B2 * | 7/2004 | Matthews et al. | ............. | 701/101 |
| 6,778,598 B2 * | 8/2004 | Happonen et al. | ............. | 375/231 |
| 6,940,924 B1 * | 9/2005 | Kim et al. | ....................... | 375/340 |
| 7,006,564 B2 * | 2/2006 | Ling et al. | ...................... | 375/232 |
| 2004/0047409 A1 * | 3/2004 | Lee et al. | ........................ | 375/232 |
| 2004/0146094 A1 * | 7/2004 | Kong et al. | ..................... | 375/148 |
| 2006/0182172 A1 * | 8/2006 | Lin | ................................. | 375/233 |
| 2007/0201547 A1 * | 8/2007 | Willcocks et al. | ............. | 375/233 |
| 2010/0046598 A1 * | 2/2010 | Zhong et al. | .................. | 375/233 |

* cited by examiner

*Primary Examiner* — Chuong D Ngo
*Assistant Examiner* — Kevin G Hughes
(74) *Attorney, Agent, or Firm* — Martine Penilla Group, LLP

(57) ABSTRACT

A feedback module is defined to receive as input a set of data sample signals and a set of reference sample signals. Each of the data and reference sample signals is generated by sampling a differential signal having been transmitted through a FIR filter. The feedback module is defined to operate a respective post cursor counter for each post cursor of the FIR filter and update the post cursor counters based on the received sets of data and reference sample signals. Also, the feedback module is defined to generate a tap weight adjustment signal for a given tap weight of the FIR filter when a magnitude of a post cursor counter corresponding to the given tap weight is greater than or equal to a threshold value. An adaptation module is defined to adapt a reference voltage used to generate the reference sample signals to a condition of the differential signal.

20 Claims, 4 Drawing Sheets

REAL-TIME OPTIMIZATION OF TX FIR FILTER FOR HIGH-SPEED DATA COMMUNICATION

BACKGROUND

High-speed data communication is conducted between a transmitter (TX) and a receiver (RX) over a differential channel. A finite impulse response (FIR) filter in the TX is used to equalize the signal transmitted over the differential channel such that the signal can be interpreted correctly upon receipt at the RX. Use of the FIR filter in the TX is particularly important for serializer/deserializer (SERDES) input/output (IO) communications. The effect of the FIR filter on the signal is defined by a setting of various function parameters in the FIR filter. Appropriate settings for the various function parameters in the FIR filter are dependent upon the differential channel properties. Because the properties of the differential channel can be influenced by external factors, such as environmental factors like temperature and humidity, pre-determined values for the various function parameters in the FIR filter may become invalid during operation of the differential channel for high-speed data communication.

For example, at low data rates (e.g., 2.5 Gbps to 3.125 Gbps), the TX FIR filter settings can be set in advance, and there will likely be no need to change the TX FIR filter settings during system operation. However, as the data rate increases (e.g., beyond 3.125 Gbps), the variation of differential channel loss as a function of temperature and humidity becomes sufficiently large that the pre-set TX FIR filter settings will likely become invalid, thereby requiring adjustment of the TX FIR filter settings during system operation. In high-speed data communications (e.g., exceeding 3.125 Gbps), real-time continuous optimization of the TX FIR filter settings is preferred to maintain adequate equalization of the TX output signal in the presence of variations in temperature and humidity.

While it is possible to theoretically estimate the required FIR filter settings based on a known pulse response of the end-to-end channel, there is no existing way to capture the pulse response of the end-to-end channel in real-time during an actual high-speed communication process, particularly a communication process utilizing a non-analog-to-digital converter (non-ADC)-based RX. Therefore, existing technologies do not enable real-time continuous optimization of TX FIR filter settings, as required to maintain adequate equalization of the TX output signal in the presence of variations in temperature and humidity.

SUMMARY

In one embodiment, a method is disclosed for real-time optimization of a finite impulse response (FIR) filter through which a differential signal is transmitted. The differential signal is received at a receiver. A dedicated pair of reference samplers is operated to extract error information from the received differential signal. The extracted error information is used to adjust one or more tap weights of the FIR filter to improve equalization of the received differential signal.

In another embodiment, an apparatus is disclosed for real-time optimization of a FIR filter through which a differential signal is transmitted. The apparatus includes a feedback module defined to receive as input a set of data sample signals and a set of reference sample signals. Each data sample signal and each reference sample signal is generated by sampling the differential signal. The feedback module is defined to operate a respective post cursor counter for each post cursor of the FIR filter and update the post cursor counters based on the received sets of data sample signals and reference sample signals. The feedback module is also defined to generate a tap weight adjustment signal for a given tap weight of the FIR filter when a magnitude of a post cursor counter corresponding to the given tap weight is greater than or equal to a preset threshold value. The apparatus also includes an adaptation module defined to adapt a reference voltage used to generate the reference sample signals to a condition of the differential signal.

In another embodiment, a system is disclosed for real-time optimization of a FIR filter in a transmitter through which a differential signal is transmitted. The system includes a feedback module defined to receive as input a set of data sample signals and a set of reference sample signals. Each data sample signal and each reference sample signal is generated by sampling the differential signal. The feedback module is defined to operate a respective post cursor counter for each post cursor of the FIR filter and update the post cursor counters based on the received sets of data sample signals and reference sample signals. The feedback module is also defined to generate a tap weight adjustment signal for a given tap weight of the FIR filter when a magnitude of a post cursor counter corresponding to the given tap weight is greater than or equal to a preset threshold value. The system also includes an adaptation module defined to adapt a reference voltage used to generate the reference sample signals to a condition of the differential signal. The system further includes a feedback state machine and an adaptation state machine. The feedback state machine is defined to control operation of the feedback module. The adaptation state machine is defined to control operation of the adaptation module. A current state of the adaptation state machine is used to control the feedback state machine.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
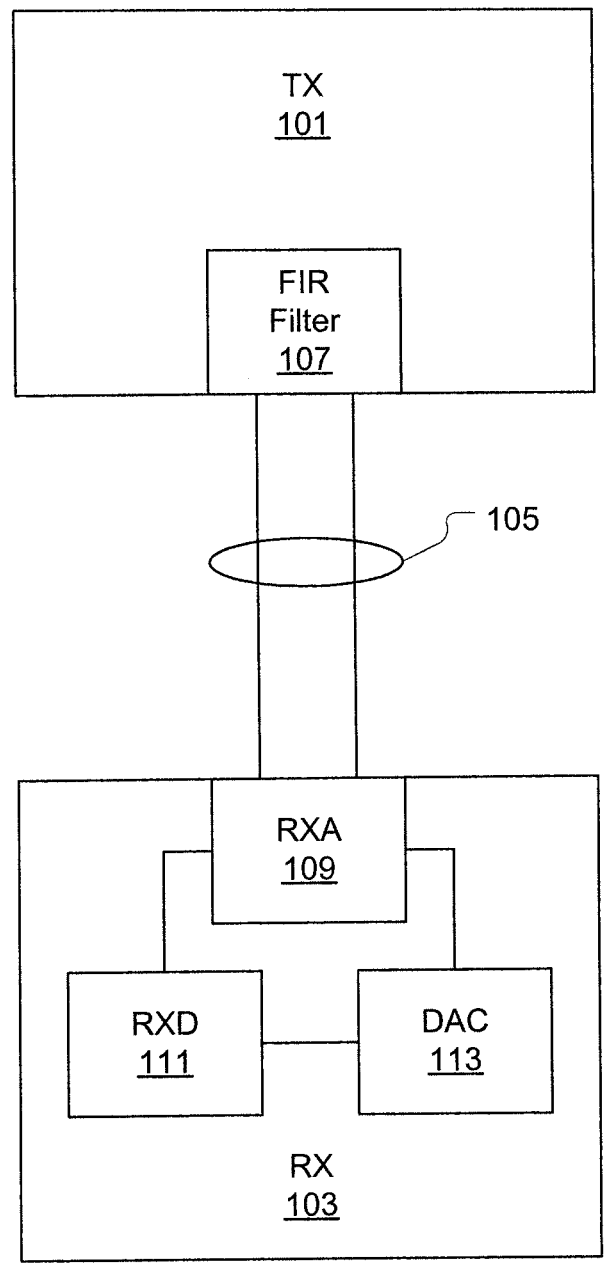
FIG. 1 is an illustration showing a communication system including a transmitter in communication with a receiver through a differential channel, in accordance with one embodiment of the present invention.

FIG. 1 is an illustration showing a communication system including a transmitter (TX) 101 in communication with a receiver (RX) 103, through a differential channel 105, in accordance with one embodiment of the present invention. The TX 101 includes a FIR filter 107 for processing the TX 101 output signal to be transmitted on the differential channel 105. The RX 103 includes an analog block (RXA) 109 having a number of samplers defined therein for sampling the data signals received over the differential channel 105. The RX 103 also includes a digital block (RXD) 111 within which digital logic is defined for various purposes. A number of digital-to-analog converters (DACs) 113 can be defined within the RX 103 to enable communication between the RXD 111 and the RXA 109. Additionally, each of the samplers defined in the RXA 109 is defined to output a digital signal that is transmitted to logic within the RXD 111.

The sampled incoming signal at the RX 103 can be represented as y(n), as shown in Equation 1, wherein the $h_e(n)$ parameters represent cursor and post cursor heights following transmittal of the signal through the TX FIR 107 and differential channel 105.

$$y(n)=x(n)h_e(0)+x(n-1)h_e(1)+x(n-2)h_e(2)+x(n-3)h_e(3) \quad \text{Equation 1}$$

Equation 1 can be rewritten as shown in Equation 2.

$$y_e(n)=x(n-1)h_e(1)+x(n-2)h_e(2)+x(n-3)h_e(3),$$

where $y_e(n)=y(n)-x(n)h_e(0)$ \hspace{1cm} Equation 2

Then, each side of Equation 2 can be multiplied by x(n−1), x(n−2), and x(n−3), to get Equations 3a, 3b, and 3c, respectively, where [x(n−a)*x(n−a)=1].

$$y_e(n)x(n-1)=h_e(1)+x(n-1)x(n-2)h_e(2)+x(n-1)x(n-3)h_e(3) \quad \text{Equation 3a}$$

$$y_e(n)x(n-2)=x(n-2)x(n-1)h_e(1)+h_e(2)+x(n-2)x(n-3)h_e(3) \quad \text{Equation 3b}$$

$$y_e(n)x(n-3)=x(n-3)x(n-1)h_e(1)+x(n-3)x(n-2)h_e(2)+h_e(3) \quad \text{Equation 3c}$$

In the long-term average, x(n−a)*x(n−b) equals zero. Therefore, in the long-term average, each of Equations 3a-3c can be rewritten as shown in Equations 4a-4c, respectively.

$$\text{average}[y_e(n)x(n-1)]=h_e(1) \quad \text{Equation 4a}$$

$$\text{average}[y_e(n)x(n-2)]=h_e(2) \quad \text{Equation 4b}$$

$$\text{average}[y_e(n)x(n-3)]=h_e(3) \quad \text{Equation 4c}$$

To have a well-equalized signal received on the differential channel 105 at the RX 103, the values of post cursors ($h_e(1)$, $h_e(2)$, and $h_e(3)$) should be as small as possible. In the TX FIR filter 107, the post cursors ($h_e(1)$, $h_e(2)$, and $h_e(3)$) can be represented as shown in Equation 5, where h(n) represents the channel pulse responses and c(m) represents the TX FIR filter 107 tap weights.

$$h_e(i) = \sum_{m=0}^{3} \sum_{m+n=i} h(n)c(m) \quad \text{Equation 5}$$

Therefore, as shown in Equation 5, the various post cursors ($h_e(1)$, $h_e(2)$, and $h_e(3)$) can be modified by adjusting the TX FIR filter 107 tap weights c(m). The method and associated apparatus disclosed herein are defined to generate and provide feedback adjustments to the TX FIR filter 107 tap weights so as maintain sufficiently small values of the post cursors ($h_e(1)$, $h_e(2)$, and $h_e(3)$) such that the signal received at the RX 103 is well-equalized. It should be appreciated that the TX FIR filter 107 can be defined to include essentially any number of post cursors $h_e(i)$. For clarity of description, the method and apparatus for optimizing the TX FIR filter 107 is described herein in terms of a TX FIR filter 107 that implements three post cursors, i.e., $h_e(1)$, $h_e(2)$, and $h_e(3)$. However, it should be understood that the method and apparatus for optimizing the TX FIR filter 107, as described herein, can also be extended to implement pre-cursors, i.e., $h_e(-1)$, $h_e(-2)$, etc. Additionally, it should be understood that the method and apparatus for optimizing the TX FIR filter 107, as described herein, can be extended to a TX FIR filter 107 implementing any number of post cursors $h_e(i)$ and/or pre-cursors $h_e(-i)$.

Figure 2:
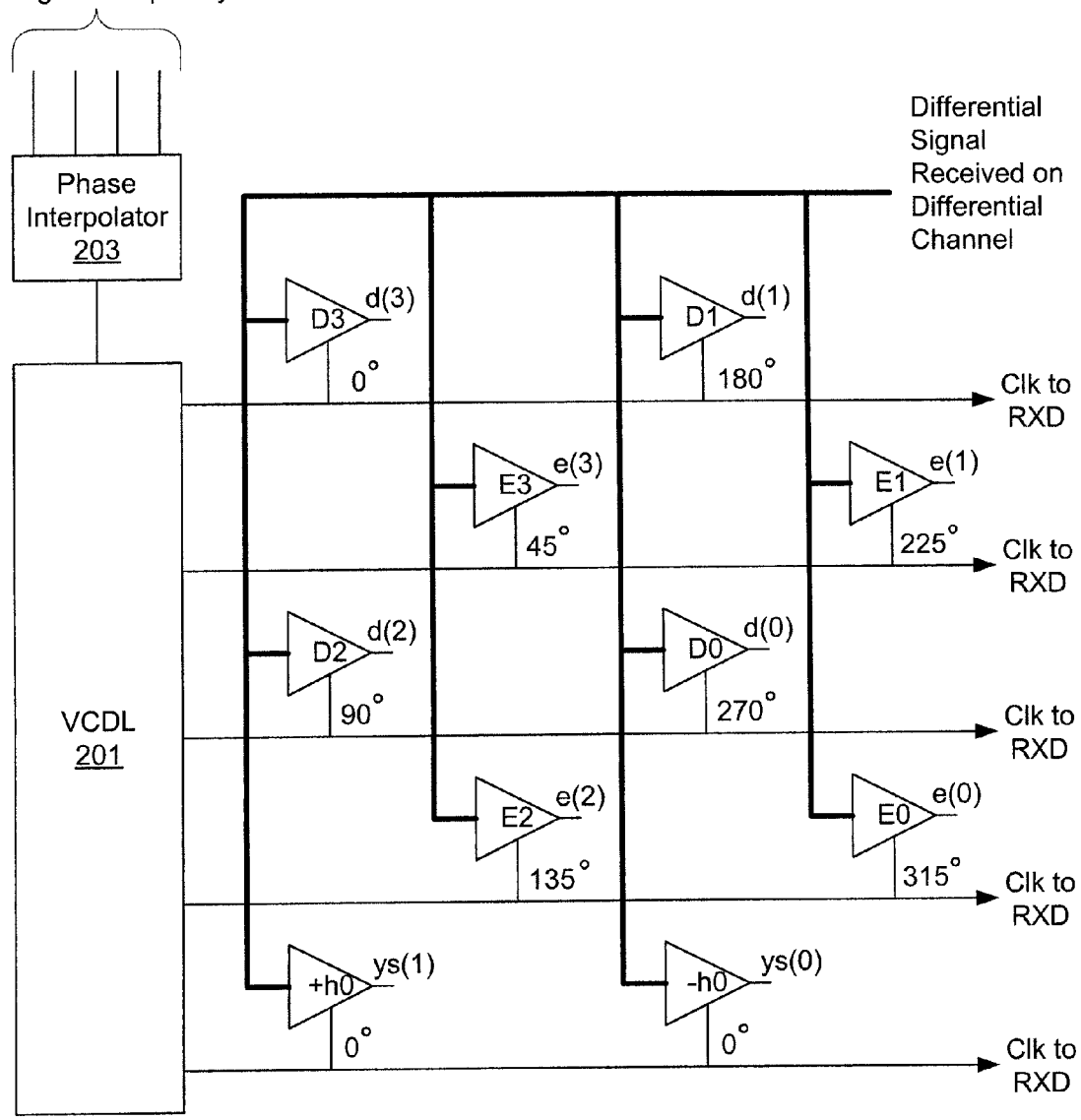
FIG. 2 is an illustration showing a set of samplers defined within the analog block of the receiver, in accordance with one embodiment of the present invention.

FIG. 2 is an illustration showing a set of samplers defined within the RXA 109, in accordance with one embodiment of the present invention. The set of samplers includes four data samplers D0, D1, D2, D3, and four edge samplers E0, E1, E3, E3, and two reference samplers +h0, −h0. Each of the data samplers D0, D1, D2, D3 is defined to receive the differential signal as an input and, at their respective instance of sampling, output a logic signal of 1 if the sampled differential signal is greater than 0 V, and output a logic signal of 0 if the sampled differential signal is less than 0 V. The output signals of D0, D1, D2, D3 are respectively represented as d(0), d(1), d(2), d(3). Therefore, the set of output signals from the data samplers is represented as d(3:0). Each of the data samplers D0, D1, D2, D3 are triggered to sample the differential signal at the expected midpoint of the differential signal, i.e., at the expected midpoint of the symbol portion of the differential signal. Therefore, D3 is triggered to sample the differential signal at a clock phase of 0°, D2 is triggered to sample the differential signal at a clock phase of 90°, D1 is triggered to sample the differential signal at a clock phase of 180°, and D0 is triggered to sample the differential signal at a clock phase of 270°.

Each of the edge samplers E0, E1, E2, E3 is defined to receive the differential signal as an input and, at their respective instance of sampling, output a logic signal of 1 if the sampled differential signal is greater than 0 V, and output a logic signal of 0 if the sampled differential signal is less than 0 V. The output signals of E0, E1, E2, E3 are respectively represented as e(0), e(1), e(2), e(3). Therefore, the set of output signals from the edge samplers is represented as e(3:0). Each of the edge samplers E0, E1, E2, E3 are triggered to sample the differential signal at the expected edge of the differential signal, i.e., at the expected edge of the symbol portion of the differential signal. Therefore, E3 is triggered to sample the differential signal at a clock phase of 450, E2 is triggered to sample the differential signal at a clock phase of 135°, E1 is triggered to sample the differential signal at a clock phase of 225°, and E0 is triggered to sample the differential signal at a clock phase of 315°.

The reference sampler +h0 is defined to receive the differential signal as an input and, when triggered to sample the differential signal at a clock phase of 0°, output a logic signal of 1 if the sampled differential signal is greater than a reference voltage +h0, and output a logic signal of 0 if the sampled differential signal is less than the reference voltage +h0. The reference sampler −h0 is defined to receive the differential signal as an input and, when triggered to sample the differential signal at a clock phase of 0°, output a logic signal of 1 if the sampled differential signal is less than a reference voltage −h0, and output a logic signal of 0 if the sampled differential signal is greater than the reference voltage −h0. The reference voltages +h0 and −h0 have the same voltage magnitude, but with opposite polarity, i.e., positive and negative, respectively. The reference voltages +h0 and −h0 are generated by a respective digital-to-analog converter (DAC) controlled by an h0 Adaptation Module, which is described with regard to FIG. 4. The output signal of the +h0 reference sampler is referred to as ys(1), and the output signal of the −h0 reference sampler is referred to as ys(0). Therefore, the set of output signals from the reference samplers is represented as ys(1:0).

A phase interpolator 203 and a voltage control delay line (VCDL) 201 are used to generate the various clocking signals that control the respective sampling instances of the set of samplers in the RXA 109. In one embodiment, the phase interpolator 203 receives four clock input signals of common frequency but different phase. For example, the four clock input signals received by the phase interpolator 203 may have respective phases of 0°, 90°, 180°, and 270°, at a common frequency. The common frequency used for each of the clock input signals to the phase interpolator 203 is equal to the frequency of the signal on the differential channel 105 divided by the number of clock input signals to the phase interpolator 203. For example, if the phase interpolator 203 receives four clock input signals and the frequency of the signal on the differential channel 105 is 12.5 GHz, then the frequency of each clock input signal to the phase interpolator 203 is 3.125 GHz, i.e., 12.5 GHz/4. Additionally, the clock signals generated by the VCDL 201 are transmitted for use by the RXD 111.

As previously mentioned, the method and associated apparatus disclosed herein are defined to generate and provide feedback adjustments to the TX FIR filter 107 tap weights so as to maintain sufficiently small values of the post cursors ($h_e(1)$, $h_e(2)$, and $h_e(3)$), such that the signal received at the RX 103 is well-equalized. To accomplish this, a TX FIR filter 107 feedback module (TXFIR FB Module) and an associated h0 Adaptation Module are implemented within the RXD 111. The TXFIR FB Module and the h0 Adaptation Module are defined to operate in accordance with respective state machines to generate and provide feedback adjustment instructions from the RX 103 to the TX FIR filter 107 on the TX 101. The TXFIR FB Module is described with regard to FIG. 3. The h0 Adaptation Module is described with regard to FIG. 4. The state machines which control the synchronous operations of the TXFIR FB and h0 Adaptation Modules are described with regard to FIG. 5.

Figure 3:
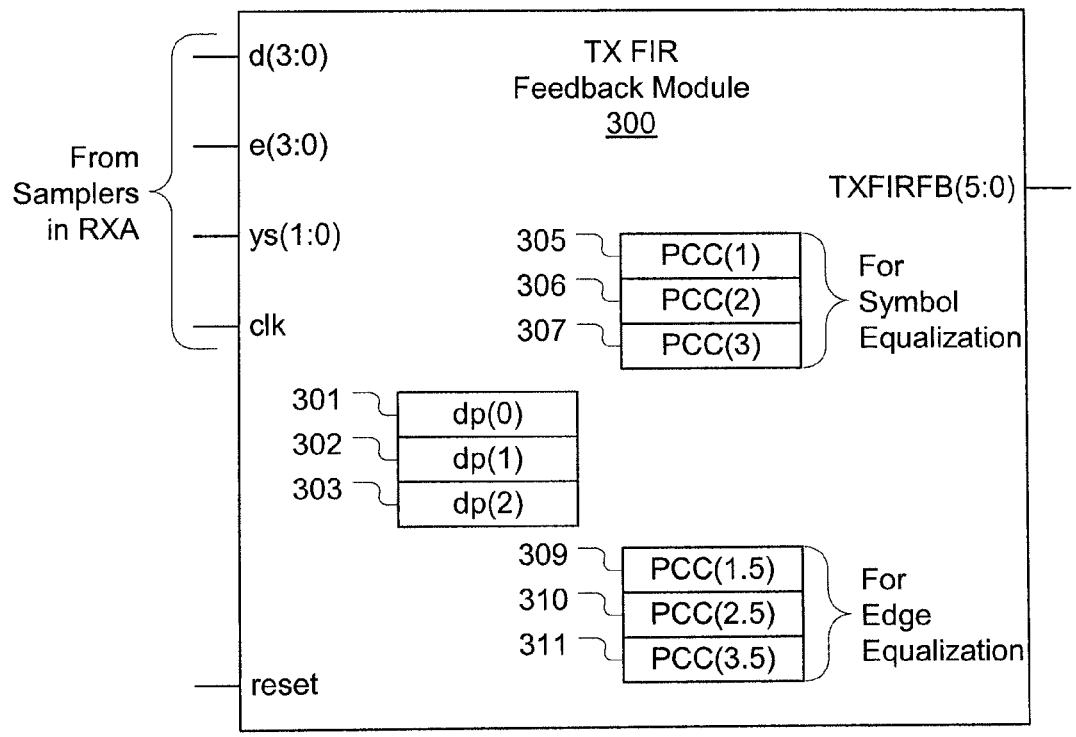
FIG. 3 is an illustration showing a TXFIR FB Module, in accordance with one embodiment of the present invention.

FIG. 3 is an illustration showing a TXFIR FB Module 300, in accordance with one embodiment of the present invention. The TXFIR FB Module 300 is defined in the RXD 111. The TXFIR FB Module 300 is connected to receive the signals d(3:0), e(3:0), and ys(1:0) from the set of samplers in the RXA 109. The TXFIR FB Module 300 is also connected to receive the 0° phase clock signal (CLK) as used to clock the +h0 and −h0 samplers in the RXA 109. The TXFIR FB Module 300 is further defined to generate a multi-bit output signal TXFIRFB(5:0) containing the TX FIR filter 107 tap weight adjustment instructions. Therefore, the TXFIRFB(5:0) signal is transmitted from the RX 103 back to the FIR filter 107 of the TX 101. The adjustment instruction for each tap weight can be one of three instructions: 1) increase tap weight, 2) decrease tap weight, and 3) maintain current tap weight. Therefore, two bits are needed in the TXFIRFB(5:0) signal to convey the adjustment instruction for each tap weight. In our illustrative example, the TX FIR filter 107 is defined to have three tap weights, namely c(1), c(2), and c(3). Therefore, the TXFIRFB(5:0) signal is defined by six bits, with two bits for each tap weight. The TXFIR FB Module 300 is also connected to receive a reset signal, which when asserted causes a number of counters PCC(i) internal to the TXFIR FB Module 300 to be reset. The reset signal is to be asserted after acknowledgement of a TXFIR update, i.e., after receipt acknowledgment of a transmitted TXFIRFB(5:0) signal.

As explained in more detail below, the TXFIR FB Module 300 can operate in either a symbol equalization mode or an edge equalization mode. In the symbol equalization mode, the TXFIR FB Module 300 uses the data sampler D3 output d(3) from the current clock cycle, and the data samplers D0, D1, D2 outputs d(2:0) from the previous clock, and the reference samplers (+h0, −h0) outputs ys(1:0) from the current cycle to determine when each tap weight c(1), c(2), c(3) in the TX FIR filter 107 should be either increased or decreased. Therefore, the TXFIR FB Module 300 includes a number of registers 301-303 to store the data samplers D0, D1, D2 outputs d(2:0) as received in the previous clock cycle.

Additionally, the method for determining when and how to adjust each tap weight, is based on tracking an average of the post cursor values $h_e(1)$, $h_e(2)$, $h_e(3)$ associated with each tap weight c(1), c(2), c(3), respectively, (see Equations 4a-4c). Counters are utilized in the TXFIR FB Module 300 to track the average of each post cursor value $h_e(1)$, $h_e(2)$, $h_e(3)$. Specifically, in the example described herein, registers 305-307 are included in the TXFIR FB Module 300 to respectively maintain running counts PCC(1), PCC(2), PCC(3) of adjustment signals H(1), H(2), H(3) for each post cursor $h_e(1)$, $h_e(2)$, $h_e(3)$. As explained below, when the magnitude of a given post cursor count (PCC(1), PPC(2), PCC(3)) reaches a threshold value (PCCTV), a tap weight adjustment instruction is generated for the tap weight associated with the given post cursor count. The direction of the tap weight adjustment instruction, i.e., increase or decrease of tap weight, is based upon the sign of the given post cursor count whose magnitude exceeded the threshold value (PCCTV). As previously mentioned, the tap weight adjustment instructions are included in the TXFIRFB(5:0) output signal which is transmitted back to the TX FIR filter 107.

In the edge equalization mode, the TXFIR FB Module 300 uses the edge sampler E0 output for the current cycle, and the data samplers D1, D2, D3 outputs d(3:1) from the current cycle to determine when each tap weight c(1.5), c(2.5), c(3.5) in the TX FIR filter 107 should be either increased or decreased. As with the symbol equalization mode, the method for determining when and how to adjust each tap weight in the edge equalization mode, is based on tracking an average of the post cursor values $h_e(1.5)$, $h_e(2.5)$, $h_e(3.5)$ associated with each tap weight c(1.5), c(2.5), c(3.5), respectively.

Counters are utilized in the TXFIR FB Module 300 to track the average of each post cursor value $h_e(1.5)$, $h_e(2.5)$, $h_e(3.5)$. Specifically, in the example described herein, registers 309-311 are included in the TXFIR FB Module 300 to respectively maintain running counts PCC(1.5), PCC(2.5), PCC(3.5) of adjustment signals H(1.5), H(2.5), H(3.5) for each post cursor $h_e(1.5)$, $h_e(2.5)$, $h_e(3.5)$. As explained below, when the magnitude of a given post cursor count (PCC(1.5), PPC(2.5), PCC(3.5)) reaches a threshold value (PCCTV), a tap weight adjustment instruction is generated for the tap weight associated with the given post cursor count. The direction of the tap weight adjustment instruction, i.e., increase or decrease of tap weight, is based upon the sign of the given post cursor count whose magnitude exceeded the threshold value (PCCTV). As previously mentioned, the tap weight adjustment instructions are included in the TXFIRFB(5:0) output signal which is transmitted back to the TX FIR filter 107.

In the symbol equalization mode, the TXFIR FB Module 300 operates to compute a signal ye(n) in each clock cycle. If the signal d(3) received from the data sampler D3 is a logic state 0, the signal ye(n) is set equal to the logic state of the signal ys(0) received from the reference sampler −h0. If the signal d(3) received from the data sampler D3 is a logic state 1, the signal ye(n) is set equal to the logic state of the signal ys(1) received from the reference sampler +h0. Then, in the symbol equalization mode, post cursor adjustment signals H(1), H(2), and H(3) are respectively generated by multiplying (i.e., XOR) the signal ye(n) with the signals dp(0), dp(1), and dp(2), wherein the signals dp(2:0) represent the signals d(2:0) received from the RXA 109 in the previous clock cycle. Specifically, in a given clock cycle H(1)=ye(n) XOR dp(0), H(2)=ye(n) XOR dp(1), and H(3)=ye(n) XOR dp(2).

In a given clock cycle, if a given post cursor adjustment signal (H(1), H(2), H(3)) is computed to have a digital state of 1, then the post cursor counter associated with the given post cursor adjustment signal is decremented by one. Conversely, in a given clock cycle, if a given post cursor adjustment signal (H(1), H(2), H(3)) is computed to have a digital state of 0, then the post cursor counter associated with the given post cursor adjustment signal is incremented by one. Specifically, if H(i)=1, then PCC(i)=PCC(i)−1. If H(i)=0, then PCC(i)=PCC(i)+1.

In a given clock cycle, if the magnitude of the value of a given post cursor counter (PCC(1), PCC(2), PCC(3)) exceeds the threshold value (PCCTV), then an instruction is generated to adjust the corresponding tap weight. If the sign of the given post cursor counter (PCC(1), PCC(2), PCC(3)) whose magnitude exceeded the threshold value (PCCTV) is positive, then the corresponding tap weight is decreased. Conversely, if the sign of the given post cursor counter (PCC(1), PCC(2), PCC(3)) whose magnitude exceeded the threshold value (PCCTV) is negative, then the corresponding tap weight is increased. Specifically, if |PCC(i)|≧PCCTV AND PCC(i)>0, then an instruction is generated to decrease c(i). Conversely, if |PCC(i)|≧PCCTV AND PCC(i)<0, then an instruction is generated to increase c(i). Also, on the TX FIR filter 107, when a given tap weight c(i) {i>0} is adjusted either up or down, the tap weight c(0) is also adjusted in compensatory manner so as to maintain the sum of the magnitudes of the tap weights equal to 1, i.e., so as to maintain Σ|c(i)|=1. Also, it should be understood that when a given post cursor counter (PCC(1), PCC(2), PCC(3)) exceeds the threshold value (PCCTV), all of the post cursor counters PCC(i) should be frozen until a receipt acknowledgement of the transmitted TXFIRFB (5:0) signal is received. Operation of the TXFIR FB Module 300 in symbol equalization mode is summarized in Table 1.

In the edge equalization mode, in each clock cycle, the TXFIR FB Module 300 operates to compute post cursor adjustment signals H(1.5), H(2.5), and H(3.5) by multiplying (i.e., XOR) the edge sampler E0 output signal e(0) with the data samplers D1, D2, D3 output signals d(1), d(2), and d(3), respectively. Specifically, in a given clock cycle H(1.5)=e(0) XOR d(1), H(2.5)=e(0) XOR d(2), and H(3.5)=e(0) XOR d(3). In a given clock cycle, if a given post cursor adjustment signal (H(1.5), H(2.5), H(3.5)) is computed to have a digital state of 1, then the post cursor counter associated with the given post cursor adjustment signal is decremented by one. Conversely, in a given clock cycle, if a given post cursor adjustment signal (H(1.5), H(2.5), H(3.5)) is computed to have a digital state of 0, then the post cursor counter associated with the given post cursor adjustment signal is incremented by one. Specifically, if H(i)=1, then PCC(i)=PCC(i)−1. If H(i)=0, then PCC(i)=PCC(i)+1.

In a given clock cycle, if the magnitude of the value of a given post cursor counter (PCC(1.5), PCC(2.5), PCC(3.5)) exceeds the threshold value (PCCTV), then an instruction is generated to adjust the corresponding tap weight. If the sign of the given post cursor counter (PCC(1.5), PCC(2.5), PCC(3.5)) whose magnitude exceeded the threshold value (PCCTV) is positive, then the corresponding tap weight is decreased. Conversely, if the sign of the given post cursor counter (PCC(1.5), PCC(2.5), PCC(3.5)) whose magnitude exceeded the threshold value (PCCTV) is negative, then the corresponding tap weight is increased. Specifically, if |PCC(i)|≧PCCTV AND PCC(i)<0, then an instruction is generated to decrease c(i). Conversely, if |PCC(i)|≧PCCTV AND PCC(i)<0, then an instruction is generated to increase c(i). Also, as previously mentioned, on the TX FIR filter 107, when a given tap weight [c(i), {i>0}] is adjusted either up or down, the tap weight c(0) is also adjusted in compensatory manner so as to maintain the sum of the magnitudes of the tap weights equal to 1, i.e., so as to maintain Σ|c(i)|=1. Operation of the TXFIR FB Module 300 in edge equalization mode is summarized in Table 2.

As described above, operation of the TXFIR FB Module 300 in the symbol equalization mode is dependent upon the magnitude of the reference voltage |h0| as supplied to the reference samplers +h0 and −h0, recalling that the reference voltage +h0 is supplied to the +h0 sampler and the reference voltage −h0 is supplied to the −h0 sampler. More specifically, the magnitude of the reference voltage |h0| will determine the output of the +h0 and −h0 samplers. Therefore, the reference voltage magnitude |h0| setting will influence the signals ys(1:0) which are used to generate the ye(n) signal, and ultimately each of the post cursor counter adjustment signals in the TXFIR FB Module 300. Furthermore, because the post cursor counter adjustment signals determine when the post cursor counters exceed the threshold value (PCCTV), it follows that the reference voltage magnitude |h0| influences generation of the tap weight adjustment signals.

TABLE 1

| TXFIR FB Module: Symbol Equalization Mode | |
|---|---|
| Function | Implementation Description |
| Compute ye(n) | if d(3)=0, then ye(n)=ys(0) |
| | if d(3)=1, then ye(n)=ys(1) |
| Generate post cursor counter adjustment signals | H(1)=ye(n) XOR dp(0) |
| | H(2)=ye(n) XOR dp(1) |
| | H(3)=ye(n) XOR dp(2) |
| Adjust post cursor counters | if H(1)=1, then PCC(1)=PCC(1)−1 |
| | if H(1)=0, then PCC(1)=PCC(1)+1 |
| | if H(2)=1, then PCC(2)=PCC(2)−1 |
| | if H(2)=0, then PCC(2)=PCC(2)+1 |
| | if H(3)=1, then PCC(3)=PCC(3)−1 |
| | if H(3)=0, then PCC(3)=PCC(3)+1 |
| Compare post cursor counters to threshold value (PCCTV) and generate tap weight adjustment signal if threshold is exceeded | if |PCC(1)|≧PCCTV AND PCC(1)>0, then instruct to decrease tap weight c(1) |
| | if |PCC(1)|≧PCCTV AND PCC(1)<0, then instruct to increase tap weight c(1) |
| | if |PCC(2)|≧PCCTV AND PCC(2)>0, then instruct to decrease tap weight c(2) |
| | if |PCC(2)|≧PCCTV AND PCC(2)<0, then instruct to increase tap weight c(2) |
| | if |PCC(3)|≧PCCTV AND PCC(3)>0, then instruct to decrease tap weight c(3) |
| | if |PCC(3)|≧PCCTV AND PCC(3)<0, then instruct to increase tap weight c(3) |

TABLE 2

TXFIR FB Module: Edge Equalization Mode

| Function | Implementation Description |
|---|---|
| Generate post cursor counter adjustment signals | H(1.5)=e(0) XOR d(1)<br>H(2.5)=e(0) XOR d(2)<br>H(3.5)=e(0) XOR d(3) |
| Adjust post cursor counters | if H(1.5)=1, then PCC(1.5)=PCC(1.5)−1<br>if H(1.5)=0, then PCC(1.5)=PCC(1.5)+1<br>if H(2.5)=1, then PCC(2.5)=PCC(2.5)−1<br>if H(2.5)=0, then PCC(2.5)=PCC(2.5)+1<br>if H(3.5)=1, then PCC(3.5)=PCC(3.5)−1<br>if H(3.5)=0, then PCC(3.5)=PCC(3.5)+1 |
| Compare post cursor counters to threshold value (PCCTV) and generate tap weight adjustment signal if threshold is exceeded | if |PCC(1.5)|≧PCCTV AND PCC(1.5)>0, then instruct to decrease tap weight c(1.5)<br>if |PCC(1.5)|≧PCCTV AND PCC(1.5)<0, then instruct to increase tap weight c(1.5)<br>if |PCC(2.5)|≧PCCTV AND PCC(2.5)>0, then instruct to decrease tap weight c(2.5)<br>if |PCC(2.5)|≧PCCTV AND PCC(2.5)<0, then instruct to increase tap weight c(2.5)<br>if |PCC(3.5)|≧PCCTV AND PCC(3.5)>0, then instruct to decrease tap weight c(3.5)<br>if |PCC(3.5)|≧PCCTV AND PCC(3.5)<0, then instruct to increase tap weight c(3.5) |

There should be a probability of about 25% that the received differential signal, as sampled at the midpoint of the symbol portion, is greater than +h0 reference voltage. Also, there should be a probability of about 25% that the received differential signal, as sampled at the midpoint of the symbol portion, is less than −h0 reference voltage. Therefore, it follows that there is a probability of about 50% that the received differential signal, as sampled at the midpoint of the symbol portion, is between the −h0 and +h0 reference voltages. During operation of the TXFIR FB Module 300 the reference voltage magnitude |h0| should be adapted to track the expected relationship between the received differential signal, as sampled at the midpoint of the symbol portion, and the reference voltages +h0 and −h0. Target conditions for h0 adaptation are summarized in Table 3. Over-equalization conditions and under-equalization conditions are summarized in Table 4.

TABLE 3

Target Conditions for h0 Adaptation

| Differential Signal -to- Reference Voltage Relationship | Reference Sampler Outputs | Expected Probability of Occurrence |
|---|---|---|
| Diff. Sig. > +h0<br>Diff. Sig. > −h0 | ys(1) = 1<br>ys(0) = 1 | 25% |
| Diff. Sig. < +h0<br>Diff. Sig. > −h0 | ys(1) = 0<br>ys(0) = 1 | 25% |
| Diff. Sig. < +h0<br>Diff. Sig. < −h0 | ys(1) = 0<br>ys(0) = 0 | 25% |
| Diff. Sig. < +h0<br>Diff. Sig. > −h0 | ys(1) = 0<br>ys(0) = 1 | 25% |

TABLE 4

Over-Equalization and Under-Equalization Conditions

| Post Cursor Signal | Post Cursor Signal State | Equalization Condition |
|---|---|---|
| H(1), H(2), H(3) | 1 | over-equalized |
|  | 0 | under-equalized |
| H(1.5), H(2.5), H(3.5) | 1 | over-equalized |
|  | 0 | under-equalized |

Figure 4:
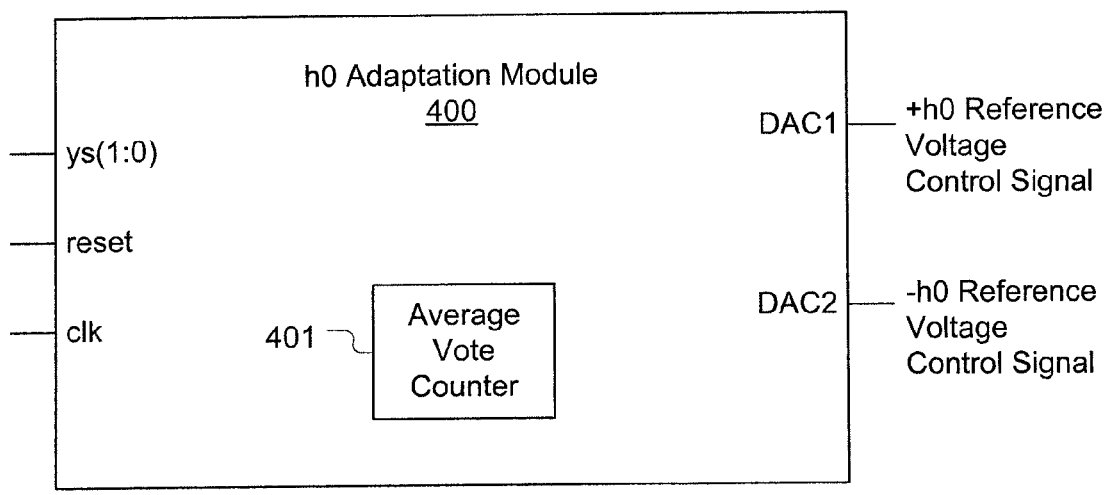
FIG. 4 is an illustration showing an h0 Adaptation Module, in accordance with one embodiment of the present invention.

FIG. 4 is an illustration showing an h0 Adaptation Module 400, in accordance with one embodiment of the present invention. The h0 Adaptation Module 400 is defined to control the reference voltages +h0 and −h0 so as to track the expected relationship between the received differential signal, as sampled at the midpoint of the symbol portion, and the reference voltages +h0 and −h0. The h0 Adaptation Module 400 is defined to receive as inputs each of the reference samplers (+h0 and −h0) output signals ys(1:0), a reset signal, and a clock signal. In one embodiment, the clock signal is the same clock signal received by the TXFIR FB Module 300. The h0 Adaptation Module 400 is also defined to generate a +h0 reference voltage control signal DAC1, and a −h0 reference voltage control signal DAC2.

As with the TXFIR FB Module 300, the h0 Adaptation Module 400 is defined in the RXD 111. The +h0 and −h0 reference voltage controls signals (DAC1 and DAC2) are digital signals that are transmitted from the RXD 111 to the DAC 113. The DAC 113 operates to generate the analog reference voltages +h0 and −h0 in accordance with the received digital signals DAC1 and DAC2, respectively. The analog reference voltages +h0 and −h0 are transmitted from the DAC 113 to the RXA 109 for use by the +h0 and −h0 samplers, respectively.

The h0 Adaptation Module 400 is defined to sequentially conduct voting periods, wherein each voting period is defined by a set number of clock cycles. In each clock cycle of a given voting period, the received reference sampler output signals ys(1) and ys(0) are multiplied (XOR) together to generate a vote signal. An average vote count is conducted during each voting period, with the average vote count being reset to zero at the start of each voting period. A register 401 is provided to store the average vote count during each voting period. If the generated vote signal in a given clock cycle is a digital state of 1, then the average vote count is decremented by one. Conversely, if the generated vote signal in a given clock cycle is a digital state of 0, then the average vote count is incremented by one.

At the end of a voting period, if the magnitude of the average vote count is greater than or equal to an average vote count threshold value (AVCTV), then the magnitude of the h0 reference voltage is updated. Specifically, if the average vote count at the end of the voting period is greater than or equal to the threshold value AVCTV, and is positive, then the magnitude of the reference voltage |h0| is increased. If the average vote count at the end of the voting period is greater than or equal to the threshold value AVCTV, and is negative, then the magnitude of the reference voltage |h0| is decreased. If the average vote count at the end of the voting period is less than the threshold value AVCTV, then the magnitude of the reference voltage |h0| is not changed.

When the magnitude of the reference voltage |h0| is adjusted up or down, the DAC1 and DAC2 signals are set to reflect the adjustment of the magnitude of the reference voltage |h0|. For example, if the magnitude of the reference voltage |h0| is to be increased at the end of a voting period, then the DAC1 signal is increased by one digital code such that the +h0 analog reference voltage is increased by a corresponding amount, and the DAC2 signal is decreased by one digital code such that the −h0 analog reference voltage is decreased by a corresponding amount. If the magnitude of the reference voltage |h0| is to be decreased at the end of a voting period, then the DAC1 signal is decreased by one digital code such that the +h0 analog reference voltage is decreased by a corresponding amount, and the DAC2 signal is increased by one digital code such that the −h0 analog reference voltage is increased by a corresponding amount.

The h0 Adaptation Module 400 is defined to operate in either a fast lock mode or a steady state mode. In the fast lock mode, the average vote count threshold value AVCTV is set to a relatively low value, e.g., 4. In the steady state mode, the threshold value AVCTV is set to a relatively higher value, e.g., 8 or 16. Following each adjustment, i.e., update, of the magnitude of the reference voltage |h0|, a blanking period is allowed to elapse before starting the next voting period. A duration of the blanking period is set to allow stabilization of the +h0 and −h0 reference samplers following the update of the +h0 and −h0 analog reference voltages.

Figure 5:
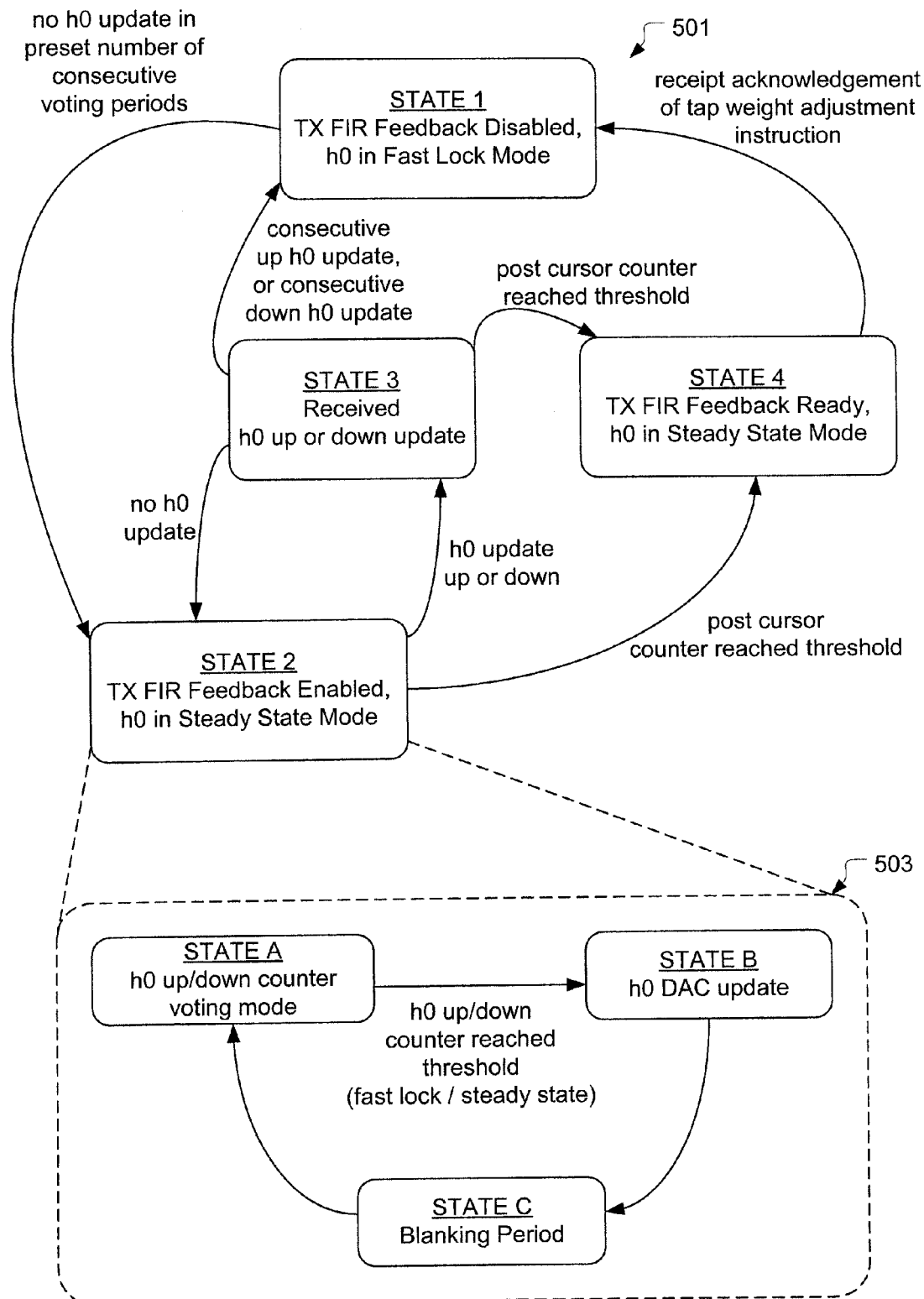
FIG. 5 is an illustration showing state machines for controlling synchronous operation of the TXFIR FB Module and h0 Adaptation Module, in accordance with one embodiment of the present invention.

FIG. 5 is an illustration showing state machines for controlling synchronous operation of the TXFIR FB Module 300 and h0 Adaptation Module 400, in accordance with one embodiment of the present invention. The TXFIR FB Module 300 operates in accordance with a feedback state machine 501, and the h0 Adaptation Module 400 operates in accordance with an adaptation state machine 503. The feedback state machine 501 is defined to receive input from the adaptation state machine 503. More specifically, transition between states in the feedback state machine 501 is dependent on the status and operational history of the adaptation state machine 503.

The feedback state machine 501 includes a State 1 in which the TXFIR FB Module 300 is disabled and all post cursor counters PCC(i) are reset, and the h0 Adaptation Module 400 is in fast lock mode. When there is no h0 reference voltage update by the h0 Adaptation Module 400 in a set number of consecutive voting periods, e.g., four consecutive voting periods, the feedback state machine 501 transitions from State 1 to a State 2. In State 2, the TXFIR FB Module 300 is enabled, and the h0 Adaptation Module 400 is in steady state mode. When in State 2, if the magnitude of any post cursor count (PCC(i)) reaches the post cursor count threshold value (PCCTV), the feedback state machine 501 transitions from State 2 to a State 4. In State 4, the tap weight adjustment instruction for the tap weight associated with the post cursor count that exceeded the threshold value PCCTV is sent from the RX 103 to the FIR filter 107. Also, in State 4 the h0 Adaptation Module 400 is in steady state mode. After receipt acknowledgement of the tap weight adjustment instruction is received from the TX 101, the feedback state machine 501 transitions from State 4 back to State 1.

With reference back to State 2, when an update (either up or down) of the magnitude of the reference voltage |h0| occurs, the feedback state machine 501 transitions from State 2 to a State 3. Following the transition to State 3, the next voting period in the h0 Adaptation Module 400 is monitored to determine whether a consecutive update of the reference voltage |h0| occurs in the same direction as the previous reference voltage |h0| update. If a consecutive reference voltage |h0| update does not occur, or does not occur in the same direction as the previous reference voltage |h0| update, then the feedback state machine 501 transitions from State 3 back to State 2.

However, if a consecutive reference voltage |h0| update does occur in the same direction as the previous reference voltage |h0| update, then the feedback state machine 501 transitions from State 3 to State 1. Therefore, whenever the reference voltage |h0| is updated in two consecutive voting periods, the TXFIR FB Module 300 is disabled and the h0 Adaptation Module 400 is placed in fast lock mode. Additionally, while waiting in State 3 for the consecutive voting period to conclude, if the magnitude of any post cursor count (PCC(i)) reaches the post cursor count threshold value (PCCTV), the feedback state machine 501 transitions from State 3 to State 4. It should be appreciated that the presence of State 3 prevents noise in the differential signal from causing spurious transitions directly from State 2 to State 1.

The adaptation state machine 503 includes a State A in which the h0 Adaptation Module 400 is operating in voting mode, i.e., is conducting a voting period. In one embodiment, the voting period is 32 RXD 111 clock cycles. At the end of the voting period, if the magnitude of the average vote count is less than the average vote count threshold value (AVCTV), then the adaptation state machine 503 transitions from State A back to State A to start the next voting period. However, at the end of the voting period, if the magnitude of the average vote count is greater than or equal to the threshold value (AVCTV), then the adaptation state machine 503 transitions from State A to State B. In one embodiment, in fast lock mode, the threshold value AVCTV is set to 4. Also, in one embodiment, in steady state mode, the threshold value AVCTV is set to either 8 or 16. However, it should be appreciated that in other embodiments, the threshold value AVCTV for the fast lock mode and steady state mode can be set at essentially any value that is suitable for the differential signal conditions.

In State B, the magnitude of the reference voltage |h0| is updated by setting the DAC1 and DAC2 signals in the h0 Adaptation Module 400. Following the update of the reference voltage |h0|, the adaptation state machine 503 transitions from State B to a State C. In State C, a blanking period duration is allowed to elapse so that the +h0 and −h0 reference samplers can stabilize to the new +h0 and −h0 reference voltages. Following completion of the blanking period, the adaptation state machine 503 transitions from State C back to State A. A new voting period commences upon entering State A from State C.

It should be understood that in one embodiment the combination of the feedback state machine 501 and the adaptation state machine 503 can be used permanently for a fully adaptive system. In another embodiment, the combination of the feedback state machine 501 and the adaptation state machine 503 can be used intermittently for a slowly varying system. In another embodiment, the combination of the feedback state machine 501 and the adaptation state machine 503 can be used once at startup for a stable system.

In one embodiment, a device may include a number of receivers in communication with a respective number of transmitters. In this embodiment, it may not be efficient with regard to chip area and power utilization to implement the TXFIR FB Module 300 and h0 Adaptation Module 400 in each receiver. However, it may be desirable for each receiver/transmitter pair to be equipped with FIR filter optimization capability. In this case, the device that includes the multiple receivers can be equipped with time domain multiplexing circuitry to enable one instance of the TXFIR FB Module 300 and h0 Adaptation Module 400 to be shared among the number of receiver/transmitter pairs.

Specifically, the time domain multiplexing circuitry can be defined to rotate use of the TXFIR FB Module 300 and h0 Adaptation Module 400 among the receiver/transmitter pairs, such that the TXFIR FB Module 300 and h0 Adaptation Module 400 are used by each receiver/transmitter pair for an apportioned period of time to improve equalization of the differential signal transmitted between the receiver/transmitter pair. Upon reassignment of the TXFIR FB Module 300 and h0 Adaptation Module 400 to a next receiver/transmitter pair in the rotation, the receiver/transmitter pair having just been optimized will retain their FIR filter settings until assignment of the TXFIR FB Module 300 and h0 Adaptation Module 400 rotates back around to them.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable storage medium. The computer readable storage medium is any data storage device that can store data which can be read thereafter by a computer system. Examples of the computer readable storage medium include hard drives, network attached storage (NAS), read-only memory, random-access memory, CD-ROMs, CD-Rs, CD-RWs, magnetic tapes, and other optical and non-optical data storage devices. The computer readable storage medium can also be accessed over a network of coupled computer systems so that the computer readable code is executed in a distributed manner.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for real-time optimization of a finite impulse response (FIR) filter through which a differential signal is transmitted, comprising:

receiving the differential signal at a receiver;

operating a dedicated pair of reference samplers to each sample the differential signal at a clock phase of 0 degree to extract error information from the received differential signal;

operating a plurality of data samplers, including a first data sampler, a second data sampler, a third data sampler, and a fourth data sampler, to sample the differential signal at clock phases of 0 degree at the first data sampler, 90 degrees at the second data sampler, 180 degrees at the third data sampler, and 270 degrees at the fourth data sampler to further extract error information from the received differential signal, wherein the clock phases of 0 degree, 90 degrees, 180 degrees, and 280 degrees are of a same clock signal; and using the extracted error information to adjust one or more tap weights of the FIR filter to improve equalization of the received differential signal.

2. A method for real-time optimization of a finite impulse response (FIR) filter through which a differential signal is transmitted as recited in claim 1, wherein each of the dedicated pair of reference samplers is defined to sample the received differential signal and compare the sampled differential signal to a respective reference voltage to generate a respective reference signal, the respective reference voltages for the dedicated pair of reference samplers have an equal magnitude and opposite polarity, and wherein the reference signal output by a given reference sampler is a high digital state when the sampled differential signal is greater than the reference voltage for the given reference sampler and is a low digital state when the sampled differential signal is less than the reference voltage for the given reference sampler.

3. A method for real-time optimization of a finite impulse response (FIR) filter through which a differential signal is transmitted as recited in claim 2, wherein the clock phase of 0 degree transitions at a midpoint of a symbol portion of the differential signal.

4. A method for real-time optimization of a finite impulse response (FIR) filter through which a differential signal is transmitted as recited in claim 2, further comprising:

using the reference signals output by the dedicated pair of reference samplers as input to a zero-forcing algorithm, wherein the zero-forcing algorithm is defined to determine a FIR filter tap weight adjustment that will force a pre or post cursor value of the FIR filter nearer to zero, wherein pre or post cursor values of the FIR filter nearer to zero improves equalization of the received differential signal.

5. A method for real-time optimization of a finite impulse response (FIR) filter through which a differential signal is transmitted as recited in claim 4, further comprising:

operating a feedback module to perform the zero-forcing algorithm; and operating an adaptation module to control the reference voltages for the dedicated pair of reference samplers.

6. A method for real-time optimization of a finite impulse response (FIR) filter through which a differential signal is transmitted as recited in claim 5, wherein the adaptation module is defined to decrease a magnitude of the reference voltages for the dedicated pair of reference samplers when the reference signals output by the pair of reference samplers differ too frequently during a period of time, and wherein the adaptation module is defined to increase the magnitude of the reference voltages for the dedicated pair of reference samplers when the reference signals output by the pair of reference samplers equate too frequently during a period of time.

7. A method for real-time optimization of a finite impulse response (FIR) filter through which a differential signal is transmitted as recited in claim 6, further comprising:

for a given period of time, incrementing a count value by one when the reference signals output by the pair of reference samplers equate in a given clock cycle, and decrementing the count value by one when the reference signals output by the pair of reference samplers differ in a given clock cycle;

at the end of the given period of time, decreasing the magnitude of the reference voltages for the dedicated pair of reference samplers when the count value is less than or equal to a negative version of a preset threshold value; and at the end of the given period of time, increasing the magnitude of the reference voltages for the dedicated pair of reference samplers when the count value is greater than or equal to a positive version of the preset threshold value.

8. An apparatus for real-time optimization of a finite impulse response (FIR) filter through which a differential signal is transmitted, comprising:

a feedback module defined to receive as input a set of data sample signals and a set of reference sample signals, wherein the set of data sample signals includes signals generated by sampling the differential signal at clock phases of 0 degree at a first data sampler, 90 degrees at a second data sampler, 180 degrees at a third data sampler, and 270 degrees at a fourth data sampler, wherein the clock phases of 0 degree, 90 degrees, 180 degrees, and 280 degrees are of a same clock signal, the set of reference sample signals generated by sampling the differential signal at the clock phase of 0 degree, the feedback module defined to operate a respective post cursor counter for each post cursor of the FIR filter and update the post cursor counters based on the received sets of data sample signals and reference sample signals, and the feedback module defined to generate a tap weight adjustment signal for a given tap weight of the FIR filter when a magnitude of a post cursor counter corresponding to the given tap weight is greater than or equal to a preset threshold value; and an adaptation module defined to adapt a reference voltage used to generate the reference sample signals to a condition of the differential signal.

9. An apparatus for real-time optimization of a finite impulse response (FIR) filter through which a differential signal is transmitted as recited in claim 8, wherein the set of data sample signals includes signals $d(3)$, $d(2)$, $d(1)$, and $d(0)$, respectively generated by sampling the differential signal at clock phases of 0 degree, 90 degrees, 180 degrees, and 270 degrees, and wherein a given data sample signal is a high digital state when the corresponding differential signal sample is greater than zero and is a low digital state when the corresponding differential signal sample is less than zero, and wherein the set of reference sample signals includes signals $ys(1)$ and $ys(0)$ and are each generated by sampling the differential signal at the clock phase of 0 degree, and wherein the reference sample signal $ys(1)$ is a high digital state when the corresponding differential signal sample is greater than a positive version of the reference voltage and is a low digital state when the corresponding differential signal sample is less than the positive version of the reference voltage, and wherein the reference sample signal $ys(0)$ is a high digital state when the corresponding differential signal sample is greater than a negative version of the reference voltage and is a low digital state when the corresponding differential signal sample is less than the negative version of the reference voltage.

10. An apparatus for real-time optimization of a finite impulse response (FIR) filter through which a differential signal is transmitted as recited in claim 9, wherein the feedback module is defined to compute in each clock cycle a signal $ye(n)$ as $ye(n)=ys(1)$ when the signal $d(3)$ is a high digital state, and $ye(n)=ys(0)$ when the signal $d(3)$ is a low digital state, and wherein the feedback module is defined to compute in each clock cycle post cursor adjustment signals $H(1)$, $H(2)$, and $H(3)$ as $H(1)=ye(n)$ XOR $dp(0)$, $H(2)=ye(n)$ XOR $dp(1)$, and $H(3)=ye(n)$ XOR $dp(2)$, wherein XOR is an exclusive-or logic function, and wherein signals $dp(0)$, $dp(1)$, and $dp(2)$, respectively correspond to signals $d(0)$, $d(1)$, and $d(2)$ as received by the feedback module in a preceding clock cycle, and wherein the feedback module is defined to update in each clock cycle post cursor counters $PCC(1)$, $PCC(2)$, and $PCC(3)$, such that $PCC(i)=PCC(i)-1$ when $H(i)$ is a high digital state, and $PCC(i)=PCC(i)+1$ when $H(i)$ is a low digital state, wherein (i) is an index for 1, 2, and 3, and wherein the feedback module is defined to generate in each clock cycle an instruction signal to decrease a tap weight $c(i)$ in the FIR filter when the magnitude of the post cursor counter $PCC(i)$ is greater than or equal to the preset threshold value and is greater than zero, and wherein the feedback module is defined to generate in each clock cycle an instruction signal to increase a tap weight $c(i)$ in the FIR filter when the magnitude of the post cursor counter $PCC(i)$ is greater than or equal to the preset threshold value and is less than zero.

11. An apparatus for real-time optimization of a finite impulse response (FIR) filter through which a differential signal is transmitted as recited in claim 9, wherein the adaptation module is defined to decrease a magnitude of the reference voltage when the signals $ys(1)$ and $ys(0)$ differ too frequently during a period of time, and wherein the adaptation module is defined to increase the magnitude of the reference voltage when the signals $ys(1)$ and $ys(0)$ equate too frequently during a period of time.

12. An apparatus for real-time optimization of a finite impulse response (FIR) filter through which a differential signal is transmitted as recited in claim 11, wherein the adaptation module is defined to update in each clock cycle of a period of clock cycles a vote counter value, such that the vote counter value is decremented by one when $ys(1)$ XOR $ys(0)$ equals a high digital state and is incremented by one when $ys(1)$ XOR $ys(0)$ equals a low digital state, wherein XOR is an exclusive-or logic function, and wherein upon completion of the period of clock cycles the adaptation module is defined to increase the magnitude of the reference voltage when a magnitude of the vote counter value is greater than or equal to a preset vote threshold value and is positive, and wherein upon completion of the period of clock cycles the adaptation module is defined to decrease the magnitude of the reference voltage when the magnitude of the vote counter value is greater than or equal to the preset vote threshold value and is negative.

13. An apparatus for real-time optimization of a finite impulse response (FIR) filter through which a differential signal is transmitted as recited in claim 8, wherein the feedback module and the adaptation module are defined in a digital block of a receiver, and wherein the FIR filter is defined in a transmitter, and wherein the receiver is defined to transmit the tap weight adjustment signal to the transmitter for implementation in the FIR filter.

14. An apparatus for real-time optimization of a finite impulse response (FIR) filter through which a differential signal is transmitted as recited in claim 13, further comprising:
  time domain multiplexing circuitry defined to rotate use of the feedback module and adaptation module among a number of receiver/transmitter pairs, such that the feedback module and adaptation module are used by each receiver/transmitter pair for an apportioned period of time to improve equalization of the differential signal transmitted between the receiver/transmitter pair.

15. A system for real-time optimization of a finite impulse response (FIR) filter in a transmitter through which a differential signal is transmitted, comprising:
  a feedback module defined to receive as input a set of data sample signals and a set of reference sample signals, wherein the set of data sample signals includes signals generated by sampling the differential signal at clock phases of 0 degree at a first data sampler, 90 degrees at a second data sampler, 180 degrees at a third data sampler, and 270 degrees at a fourth data sampler, wherein the clock phases of 0 degree, 90 degrees, 180 degrees, and 280 degrees are of a same clock signal, the set of reference sample signals generated by sampling the differential signal at the clock phase of 0 degree, the feedback module defined to operate a respective post cursor counter for each post cursor of the FIR filter and update the post cursor counters based on the received sets of data sample signals and reference sample signals, and the feedback module defined to generate a tap weight adjustment signal for a given tap weight of the FIR filter when a magnitude of a post cursor counter corresponding to the given tap weight is greater than or equal to a preset threshold value;
  an adaptation module defined to adapt a reference voltage used to generate the reference sample signals to a condition of the differential signal;
  a feedback state machine defined to control operation of the feedback module; and
  an adaptation state machine defined to control operation of the adaptation module, wherein a current state of the adaptation state machine is used to control the feedback state machine.

16. A system for real-time optimization of a finite impulse response (FIR) filter in a transmitter through which a differential signal is transmitted as recited in claim 15, wherein the feedback state machine is defined to maintain the feedback module in a disabled state when the adaptation module is operating in a fast lock mode, and wherein the feedback state machine is defined to enable the feedback module when a preset amount of time has elapsed without a change in the reference voltage by the adaptation module.

17. A system for real-time optimization of a finite impulse response (FIR) filter in a transmitter through which a differential signal is transmitted as recited in claim 15, wherein the feedback state machine is defined to maintain the feedback module in an enabled state until two consecutive reference voltage adjustments are made by the adaptation module in a same adjustment direction, and
  wherein the feedback state machine disables the feedback module when two consecutive reference voltage adjustments are made by the adaptation module in the same adjustment direction.

18. A system for real-time optimization of a finite impulse response (FIR) filter in a transmitter through which a differential signal is transmitted as recited in claim 15, wherein the feedback state machine is defined to transmit the tap weight adjustment signal to the FIR filter upon its generation, wait for receipt acknowledgement of the tap weight adjustment signal, and upon receipt acknowledgement of the tap weight adjustment signal disabled the feedback module and direct the adaptation state machine to place the adaptation module in fast lock mode.

19. A system for real-time optimization of a finite impulse response (FIR) filter in a transmitter through which a differential signal is transmitted as recited in claim 15, wherein the adaptation state machine is defined to direct the adaptation module to continuously conduct consecutive voting periods, wherein each voting period is defined by a set number of clock cycles, the adaptation state machine further defined to direct the adaptation module to evaluate whether or not the reference voltage should be updated at the end of each voting period and update the reference voltage if required.

20. A system for real-time optimization of a finite impulse response (FIR) filter in a transmitter through which a differential signal is transmitted as recited in claim 15, wherein the adaptation state machine is defined to direct the adaptation module to operate in either a fast lock mode or a steady state mode, wherein a criteria for reference voltage update in the fast lock mode is more rapidly satisfied than a criteria for reference voltage update in the steady state mode.

* * * * *